(12) United States Patent
Traint

(10) Patent No.: US 7,385,623 B2
(45) Date of Patent: Jun. 10, 2008

(54) SYSTEM FOR BIDIRECTIONAL AUDIO AND VIDEO RECORDING AND REPRODUCTION

(76) Inventor: Andreas Traint, Markt 11, A-2842 Edlitz (AT)

( * ) Notice: Subject to any disclaimer, the term of this patent is extended or adjusted under 35 U.S.C. 154(b) by 545 days.

(21) Appl. No.: 10/518,313

(22) PCT Filed: Jun. 17, 2003

(86) PCT No.: PCT/AT03/00171

§ 371 (c)(1),
(2), (4) Date: Dec. 16, 2004

(87) PCT Pub. No.: WO04/002151

PCT Pub. Date: Dec. 31, 2003

(65) Prior Publication Data

US 2005/0206722 A1    Sep. 22, 2005

(30) Foreign Application Priority Data

Jun. 20, 2002    (AT)    ................................ A 932/2002

(51) Int. Cl.
  *H04N 7/14*    (2006.01)
(52) U.S. Cl. .................................. 348/14.16; 348/14.01
(58) Field of Classification Search ............. 348/14.16, 348/14.01
See application file for complete search history.

(56) References Cited

U.S. PATENT DOCUMENTS 6,781,619 B1 *    8/2004    Shirakura et al. ............. 348/46

FOREIGN PATENT DOCUMENTS

EP    1119196    7/2001

* cited by examiner

*Primary Examiner*—Stella Woo
(74) *Attorney, Agent, or Firm*—Andrew Wilford

(57) ABSTRACT

The invention relates to a system for bidirectional audio and video recording and reproduction between at least two locations. Said system comprises, in addition to data transmission lines or transmitters and receivers, at least one respective television camera (7, 8, 9, 10; 25) and respective screen. The screen, which can be configured as a translucent projection screen (3) or as a belt (21), has at least one gap (4, 24) or break that acts as the view for the television camera (7, 8, 9, 10; 25). The projected image is blanked out for the television camera (7, 8, 9, 10; 25). The gap (4, 24) and screen, in particular the projection screen (3) can be displaced transversally to the gap (4, 24). The television cameras (7, 8, 9, 10; 25) and projectors (11, 12, 13, 14; 28) are positioned in a fixed manner inside the rotating cylinder (2), in such a way that the television cameras (7, 8, 9, 10; 25) compose images by scanning through the revolving gap (4, 24) and the projectors (11, 12, 13, 14; 28) simultaneously project stationary images onto the revolving projection screens (3).

4 Claims, 1 Drawing Sheet

SYSTEM FOR BIDIRECTIONAL AUDIO AND VIDEO RECORDING AND REPRODUCTION

CROSS REFERENCE TO RELATED APPLICATIONS

This application is the US national phase of PCT application PCT/AT2003/000171 filed 17 Jun. 2003 with a claim to the priority of Austrian patent application A932/2002 itself filed 20 Jun. 2002.

FIELD OF THE INVENTION

The invention relates to a system for the bidirectional recording and reproduction of video and audio at at least two locations, each of which has at least one respective video camera and each at least one display screen, preferably a light-transmissive projection wall or a display wall with light-emitting diodes or the like as image points.

STATE OF THE ART

With respect to the invention, television as well as picture telephony is known. In a conferencing set up the partners participating in the conference, while spatially separated, can speak with and see one another. For this purpose, of course, each video camera has a monitor as a reproduction device which displays the image from the television camera of the remote pick-up location. During the discussion each participant in the discussion glances at the display screen. His image however is picked up by a camera arranged above or below or laterally of the display screen. As a result there is no eye to eye contact of the participants in the conversation. The transmission is a transmission of lifeless images.

There are systems known in which an image is projected from below with a display screen inclined at a 45° angle like that of a lectern. The camera is provided at eye level behind the image screen. This allows the pick up and reproduction to be realized in an in-line manner with the image and the pick up flowing into one another. However, the inclined orientation of the plate forming the display screen requires an additional spacing from the individual which is undesirable.

In U.S. Pat. No. 4,928,301, a station is described in which the pick up and projection is effected by means of or through a mirror. Directly ahead of the viewer a liquid crystal screen is provided which alternates between a glass-clear or transparent state and a cloudy, frosty or opaque state. During the glass-clear phase of the screen, the camera is triggered for the pick up of an image through the screen without interference. In the next instant, an image is projected on the frosted or opaque image screen. The screen therefore alternates from translucent to transparent in an electrical manner rather than a mechanical manner.

OBJECT OF THE INVENTION

The invention has as its object to provide a direct confrontation of individuals with the effect of direct eye contact to the greatest extent possible.

SUMMARY OF THE INVENTION

This can be achieved in that the image screen, preferably the projection wall or screen is formed with at least one gap as a free throughgoing optical passage for the television camera which is masked from the projected image or which is free from the light-emitting diodes and in that the gap is movable transversely to its longitudinal direction to pick up a complete image in over the pick-up or reception television camera together with the projection wall, whereby the transit speed of the gap lies above the perception limit of the human eye while the projection or reproduced image remains stationary on the movable projection wall. Thus while the transmitted image from the remote station remains stationary on the circulatingly movable fabric screen or projection surface, a smaller projection-free gap continuously travels past the observer and is scanned by a camera (television camera), trained on the viewer which transmits his or her image to the remote station. The result is a flow of the reproduction and pick up of the two stations into one another so that any jitter as a result of the traveling speed of the gap passing by or from a multiplicity of such gaps is not visible. The cameras are at eye level. The result is a reproduction close to reality. At both stations it is possible to make the screen directly accessible so that the hand can be laid flat upon a stationary transparent jacket surrounding the rotating image screen and thereby giving the impression of direct contact with the opposite user.

It is advantageous to provide the projection wall as the surface of a vertical circular cylinder which is provided in spaced relationship with glass-clear zones with gaps or openings [slits] along respective generatrices of the right circular cylinder when, for example, television cameras are disposed at fixed locations in the interior of the circular cylinder and covering four quadrants and when at the gaps radial light-tight walls are provided to form the reception shafts which end adjacent optics of the television cameras and are rotatably driven around together with the projection wall. The cylindrical configuration can be located at open spaces in Vienna and Munich. Each of the two stations transmits a panoramic image of the area and people can associate together and engage in eye contact with one another utilizing microphones and loud speakers built into the unit. A diameter of the screen can be 3 to 6 meters and even 8 meters in a preferred application. Naturally the rotating screen is surrounded by the stationary cylinder of transparent material. The television cameras can be enclosed in a light-tight casing rotating with the projection wall, the substantially light-tight casing having a single light admitting region [for each camera] radially of the receiving or pick-up shaft, thereby ensuring a complete optical separation of pick up and projection in the interior of the station without mutual light interference. This allows time multiplex arrangements of image reproduction and subsequent pick up in a common viewing field.

Another embodiment is characterized in that the projection wall is configured as a transparent flexible belt running over rerouters like rerouting rollers and which has gaps or slits for the free optical access for the television camera transverse to the travel direction and which is provided directly adjacent the television camera with a synchronously rotating diaphragm or shutter which covers the projection surface of the projector for pick up by the television camera. In this manner even straight image surfaces with for example flat images, especially a flat panorama image can be produced without limitation as to its length. Furthermore it is possible to project the images from the exterior on the circularly cylindrical transparent wall such that the wall is movable and is provided with gaps for the television camera which is likewise located externally of the screen. The viewer can then stand in the interior of the circular cylinder and has the impression that he or she is in another city in which he is in eye contact and can talk to the people passing by in the projection.

As the image screen, each of the embodiments according to EP 0 704 135 B1 or EP 0 454 244 B1 can be used. Because of the round construction in the example, image sharpness upon projection is especially good (there is uniform sharpness over the entire image).

BRIEF DESCRIPTION OF THE DRAWING

Embodiments of the subject matter of the invention have been illustrated schematically in the drawing.

SPECIFIC DESCRIPTION

Figure 1:
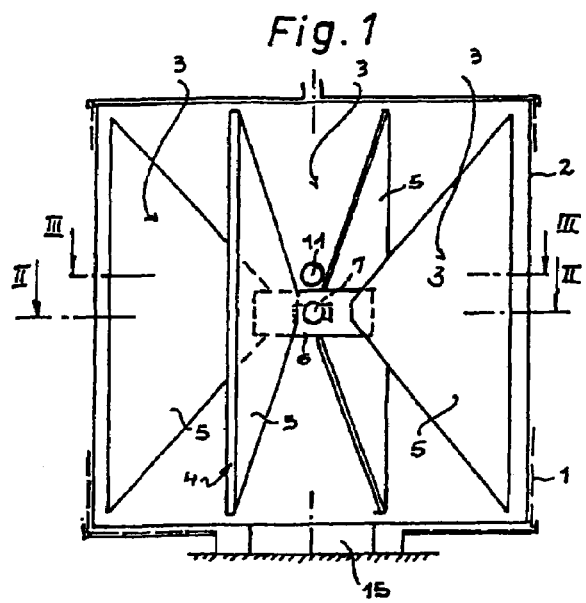
FIG. 1 shows a view from the interior of a system according to the invention.

The drawings illustrate the basic principle of a system which is comprised of a pick up, that is image acquisition,] and reproduction station with television cameras and image screen projection with at least one second such system or station connection to the station shown by communication lines, terrestrial radio wave transmission or satellite communication. Television cameras and transmitters of the two stations transmit the respective images, for example of the immediate surroundings, to the respective other station for reproduction. Sound is also simultaneously transmitted in both directions. For this purpose each station functions somewhat as a picture telephone for a possible participant in a two-way conversation or for communication between respective passers by upon an open arrangement of the systems or stations at different locations in spite of the spatial separation of the passers by at the respective stations, to the extent the partners to a conversation or the respective passers by desire to communicate with one another over the system. Apart from the communication being life-like as to the size of the image, it provides for pick up and reproduction of images as if the subjects were near by with the result that it allows direct eye contact of the individuals to be generated in spite of the fact that the individuals are at greatly separated locations.

BEST EMBODIMENT OF THE INVENTION

For this purpose within a transparent clear-glass stationary plastic cylinder 1, a second rotatably driven circular cylinder 2 is provided whose outer surface is configured in segments as a light-transmissive projection wall 3 (FIGS. 2, 3) along several generatrices of the circular cylindrical surface 2 gaps 4 are provided which are not only translucent but are also glass clear. At the gaps 4 of which here four are shown and whose number can be higher (for example 32), radial pick up shafts 5 are connected which are directed radially inwardly. These four pick up shafts 5, shown in FIGS. 1-3, rotate with the circular cylinder 2. The pick up shafts 5 open in a central casing 6 rotating with the shafts and in which four television cameras 7, 8, 9, 10 are stationarily arranged. The camera 7 has an image angle or a pick up objective with an angle of view of 90° (given by way of example for understanding of the invention), but acquiring only the image segment which can be obtained through the pick-up shaft 5. The casing 6 and each pick-up shaft 5 is closed at its top or to its sides apart from the radial passage in a light-tight manner. The entire aforementioned assembly rotates while the cameras 7, 8, 9, 10 are stationary. As a consequence the camera 7 scans an image as a consequence of the angular movement of the gap 5 within the camera angle of 90° and within a short time period corresponding to the rotary speed of the circular cylinder 2 and transmits this image to a receiver with a projector of an identically constructed system of a counter station in which the projector there corresponds exactly to the projector 11 in FIG. 3. The projector 11 thus receives the image scanned by the gap of a camera of the other station which may correspond to the camera 7 of FIG. 2.

Figure 3:
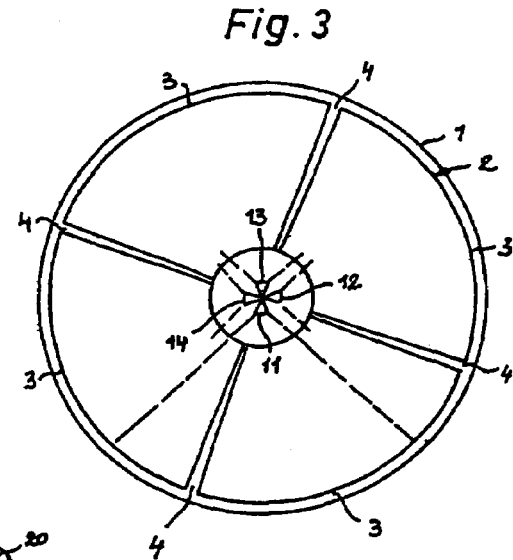
FIG. 3 shows a section along line III-III in FIG. 1.

In FIG. 3 the projector 11 projects its image within an angle of 90° so that the projector 11 and 12, 13, 14, a 360° panoramic image is formed which is transmitted from the opposite station and is displayed at the station with the projectors. The projectors 11-14 are fixed in position like the directly adjoining cameras 7-10. The projection of the panoramic image produced by the projectors on the rotating projection wall is visible. The speed of rotation as well as the widths of the gaps 4 and the ratio of the gap area to the projection area is so selected that the speed of passage of the gap 4 past the viewer is not noticeable even when more than four gaps are provided, for example 32 gaps are provided.

Figure 4:
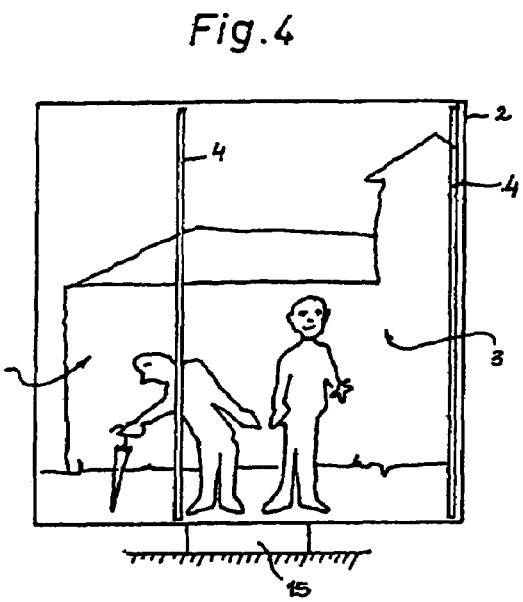
FIG. 4 shows a picture captured at a particular instant of the system in an arrangement with a projection from a remote system.

In FIG. 4 the display shows an instant during the operation and in which the gap 4 is visible as if the screen has momentarily come to standstill and through which the camera 7 behind that gap has taken a picture of a strip of the surroundings. Upon rotation of the circular cylinder 2 the display of the projected image which is visible to the viewer does not change by reason of the rotation. The gap 5 traveling past is at a speed above the detection limit of the human eye. The cameras 7, 8, 9 form complete images in the unit of time for the travel of the slit through the viewing angle of the camera and send their images to the projectors of the opposite station.

Figure 2:
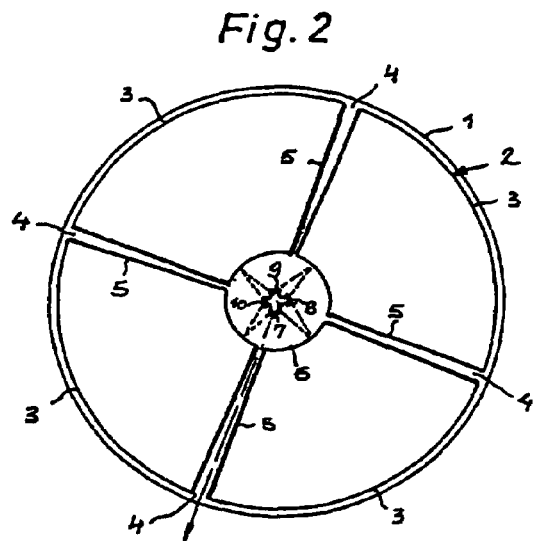
FIG. 2 shows a section along the line II-II in FIG. 1.

In the base of the system at each station shown in FIGS. 1 and 4 motors 15 are provided which rotatably drive the respective circular cylinders to circulate the alternating projection walls 3 and gaps 4. The speed can be high enough that the gaps 4 optically disappear.

Figure 5:
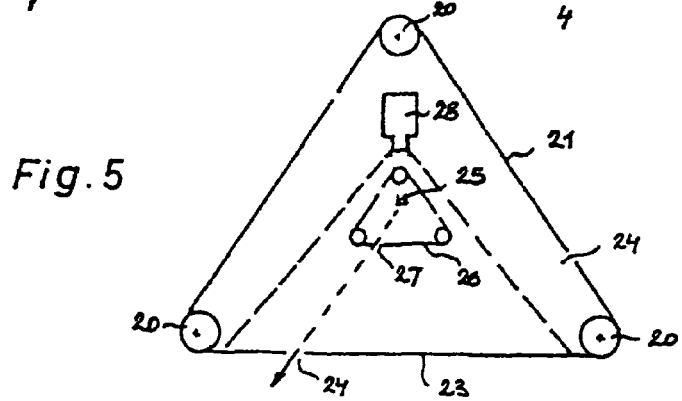
FIG. 5 shows a basic principle of another construction deviating from the circularly cylindrical shape.

In FIG. 5 as an alternative to the circular cylinder 2, a flexible belt 21 traveling about rerouting rollers 20 is provided which at spaced-apart locations between light-transmissive regions forming projection walls 23 completely glass-clear transparent zones are provided as gaps or slits 24. Within the belt, a television camera 25 is provided behind a shutter 26 traveling synchronously with the belt 21. Gap 24 and shutter opening 27 register with one another and cover for the optics of the camera 25 the projected image of a projector 28 on the belt 21. The television camera 25 is shielded above and below against stray light from the projection.

The embodiment of FIG. 5 supplies a limited flat image by contrast to the 360° panoramic image of FIGS. 1 to 4. Display screens following flat surfaces to slightly bulging or other optional curvatures can be made to any desired length and can follow one another without intervening spacing to provide the configuration of a larger display screen.

Instead of a projection circulating displays using diode-based or liquid-crystal-based displays can also be used with corresponding multiplexing software which can obtain the image information directly from the cameras of the opposite station.

The arrangement of the optics of the cameras 7 to 10 generally at the eye level of people whose images are to be captured by the cameras can provide a distortion-free and realistic impression of true contact with these individuals even in this otherwise virtual system. The system can use structures involving image monitors, video conferencing systems and even large image projectors.

The invention claimed is:

1. A system for bidirectional acquisition and reproduction of images and sound at at least two locations, each of which has a television camera and a display screen, wherein the display screen has a respective longitudinally extending gap as a free viewing path for the respective television camera, with respect to which a projected image is shielded out or which is free from light-emitting diodes or the like, and in that the respective gap is movable transversely to its longitudinal direction to pick up a complete image within the framework of a reception angle of the respective television camera together with the display screen, whereby a travel speed of the gap is above a detection limit of the human eye while a projected or reproduced image on the display screen remains stationary.

2. The system according to claim 1 wherein as display screen the surface of an optical circular cylinder is provided which has glass clear zones or openings along respective generatrices of a circular cylinder in spaced relationship as the gaps, the television cameras for four quadrants are arranged stationarily in the interior of the circular cylinder and in that the gaps are delimited by radial light-tight walls defining pickup shafts which end adjacent optics of the television cameras and are driven together with the display screen in a circular path.

3. The system according to claim 2 wherein the television cameras are each surrounded by a light-tight casing rotating with the respective display screen to which the pickup shafts extending in the radial direction are connected as sole light-admission region.

4. The system according to claim 1 wherein the display screen is a flexible light-transmissive belt traveling around rerouting rollers and provided with a gap or slit transverse to the travel direction through which the television camera can take a picture freely and in that directly adjacent the television camera a synchronously traveling shutter is provided for image acquisition of the respective television camera which shields a projection surface of a projector for image acquisition by the respective television camera.

* * * * *